United States Patent
Bomhoff et al.

(10) Patent No.: US 7,486,691 B2
(45) Date of Patent: Feb. 3, 2009

(54) METHOD, LOGIC ARRANGEMENT AND PROGRAM FOR ASSIGNING A PRIMARY TRUNK

(75) Inventors: Matthew David Bomhoff, Tucson, AZ (US); Paul Nicholas Cashman, Alton (GB); Andrew Ellis Seidel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 10/833,204

(22) Filed: Apr. 26, 2004

(65) Prior Publication Data

US 2005/0238039 A1     Oct. 27, 2005

(51) Int. Cl.
*H04L 12/28*     (2006.01)

(52) U.S. Cl. .................................. 370/431

(58) Field of Classification Search ............ 370/431, 370/254
See application file for complete search history.

(56) References Cited

U.S. PATENT DOCUMENTS

| | | | |
|---|---|---|---|
| 6,032,194 A * | 2/2000 | Gai et al. ............... | 709/239 |
| 6,532,212 B1 | 3/2003 | Soloway et al. ......... | 370/230 |
| 6,728,205 B1 * | 4/2004 | Finn et al. .............. | 370/217 |
| 6,973,023 B1 * | 12/2005 | Saleh et al. ............. | 370/217 |
| 2002/0156918 A1 | 10/2002 | Valdevit et al. .......... | 709/238 |
| 2004/0081186 A1 * | 4/2004 | Warren et al. ........... | 370/419 |

* cited by examiner

*Primary Examiner*—Chirag G Shah
*Assistant Examiner*—Otis L Thompson, Jr.
(74) *Attorney, Agent, or Firm*—Dale F. Regelman; Quarles & Brady LLP

(57) ABSTRACT

Method, logic arrangement or program employ trunking identifiers to assign primary trunking connection between a switch pair.

26 Claims, 3 Drawing Sheets

METHOD, LOGIC ARRANGEMENT AND PROGRAM FOR ASSIGNING A PRIMARY TRUNK

FIELD OF THE INVENTION

The present invention relates to loop networks, and particularly to loop networks having attached switches with trunking communications capabilities.

BACKGROUND OF THE INVENTION

Loop network topologies such as Fibre Channel Arbitrated Loop (FC-AL) networks are currently starting to use switch technologies in order to improve bandwidth by taking advantage of the capabilities that spatial reuse can give. In order to do this, trunking is used, where trunking is an extra connection, that allows multiple Host Bus Adapters (HBAs) to use the same FC-AL for data transfer simultaneously; where the switch uses different trunks for different I/O paths, one for each HBA. This concept of inter-switch trunking is well-known in the art and need not be further described here.

The current switch technology is not directly capable of appreciating (or assigning primary and secondary roles to) the trunks to be used dynamically, but rather needs the assignment to be appreciated for it. Herein lies a problem, where the switch technology needs to be informed of the nature of each trunk, such that it can perform this task.

This can be achieved today by assigning certain characteristics to each possible connection. This, however, creates the problem that the nature of the connection is determined in advance rather than determined at the time of connection. Errors in the cabling can therefore cause the trunking to fail, which is very undesirable.

Another alternative is to have a manual appreciation after the cables are assigned. This, however, relies on accurate understanding of the cabled system and as such is prone to operator error and also adds another step in the process where FC-AL does not normally need such a step.

Techniques such as choosing the 'first connection' as the primary and the 'second connection' as the secondary are flawed, as the way in which this rule may cause the network to behave is dependent both upon time and switch behaviour, which may not be deterministic.

SUMMARY OF THE INVENTION

This invention thus preferably uses trunking identifiers to automatically assign the correct trunk type accordingly. It makes use of the details of the connection and a commonly-implemented method which is operable independently by each member of a switch pair; because both the data and the method are shared by both members, this provides a deterministic assigment method that is common to all components.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

Figure 1:
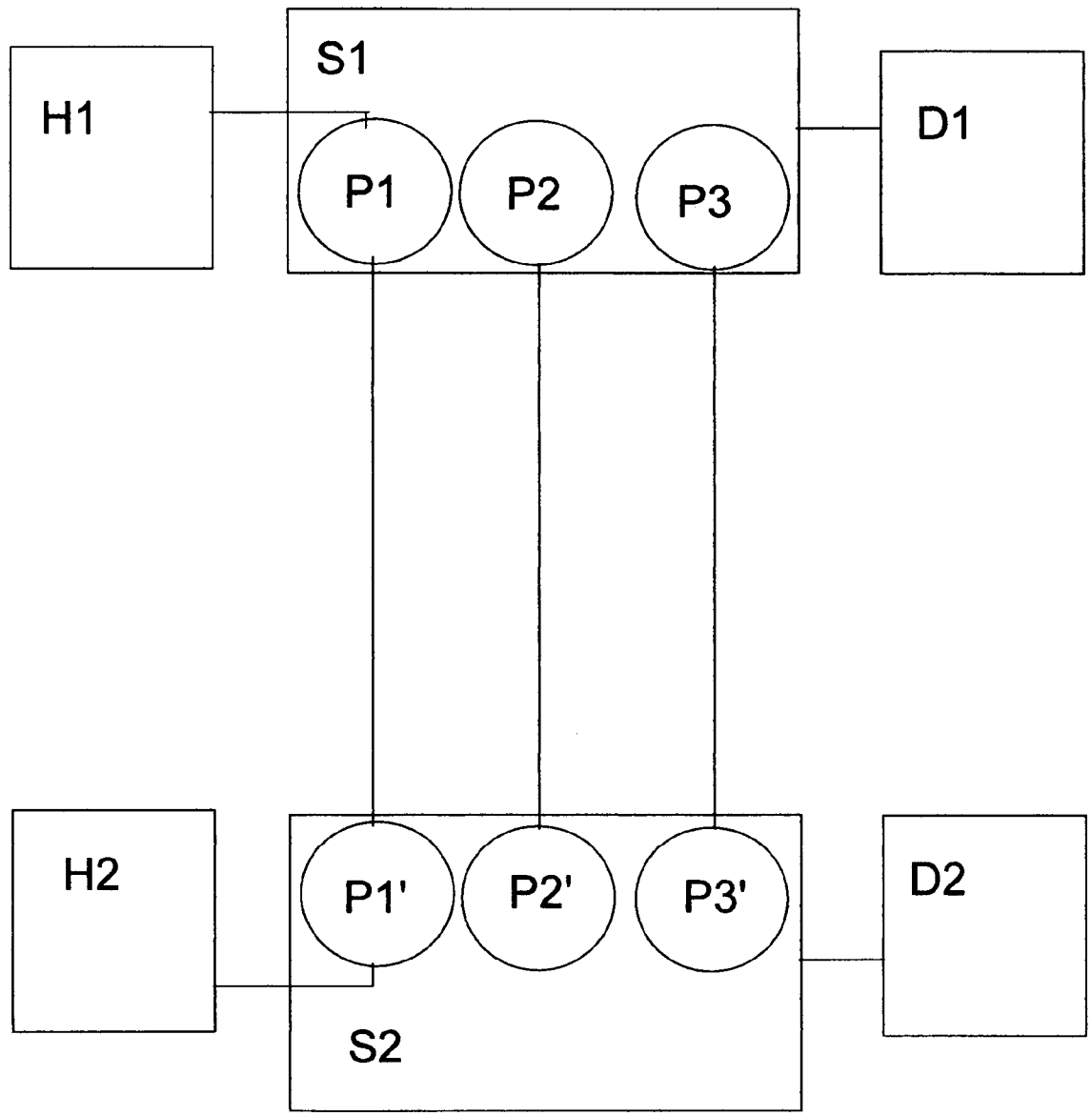
FIG. 1 shows a switch pair in which the present invention may be embodied.

Turning to FIG. 1, there is shown a switch arrangement comprising a pair of switches S1, S2, each owning a set of ports: S1 owns P1, P2, P3; S2 owns P1',P2', P3'. Switch S1 is connected to host H1 and data storage D1, while switch S2 is connected to host H2 and data storage D2.

The system has been cabled in the simplest possible way, giving a configuration that could be simply expressed as (S1,P1;S2,P1') (S1,P2;S2,P2') (S1,P3;S2,P3').

Figure 2:
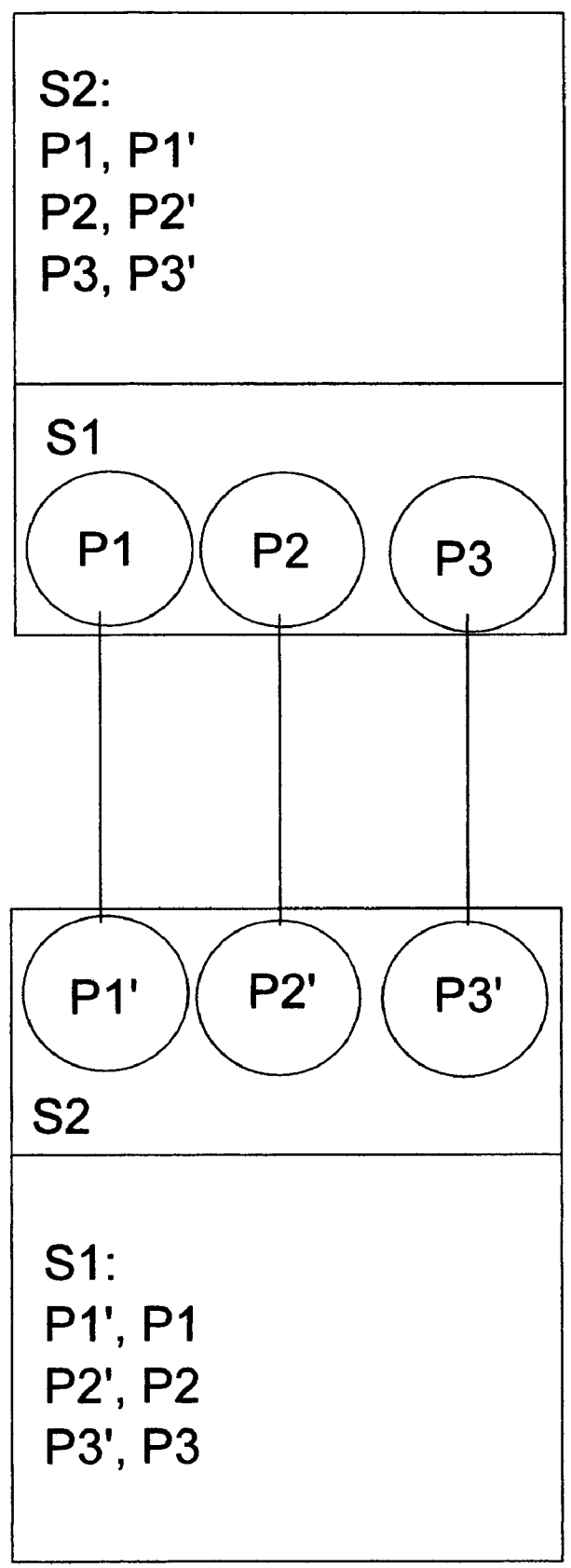
FIG. 2 illustrates the structure of the identity data at each of the switch pair according to a preferred embodiment of the present invention.

Turning to FIG. 2, switches S1 and S2 are shown, each with its respective ports P1, P2, P3; P1', P2', P3'. Also shown is a representation in each switch of the trunk connections between the ports. Thus, S1 is aware that it is connected to S2 via its own ports P1, P2, P3 (shown as the leftmost column in its ordered pair list). S1 can compare its serial number with that of S2. In this exemplary case it is lower, so S1 knows it is master, and thus selects the lowest numbered of its own ports (lowest serial number in the leftmost column): P1. Thus S1 nominates the trunk connection between P1 and P1' as primary.

S2, likewise, is aware that it is connected to S1 via its own ports P1', P2', P3' (shown as the leftmost column in its ordered pair list). S2 can compare its serial number with that of S1. In this case it is higher, so S2 knows it is subordinate, and thus selects the lowest numbered of its master's ports (lowest serial number in the rightmost column): P1. Thus S2 also nominates the trunk connection between P1 and P1' as primary.

Should connection P1, P1' become unavailable, each switch performs a similar nomination process by performing a like comparison using the remaining connected ports.

Figure 3:
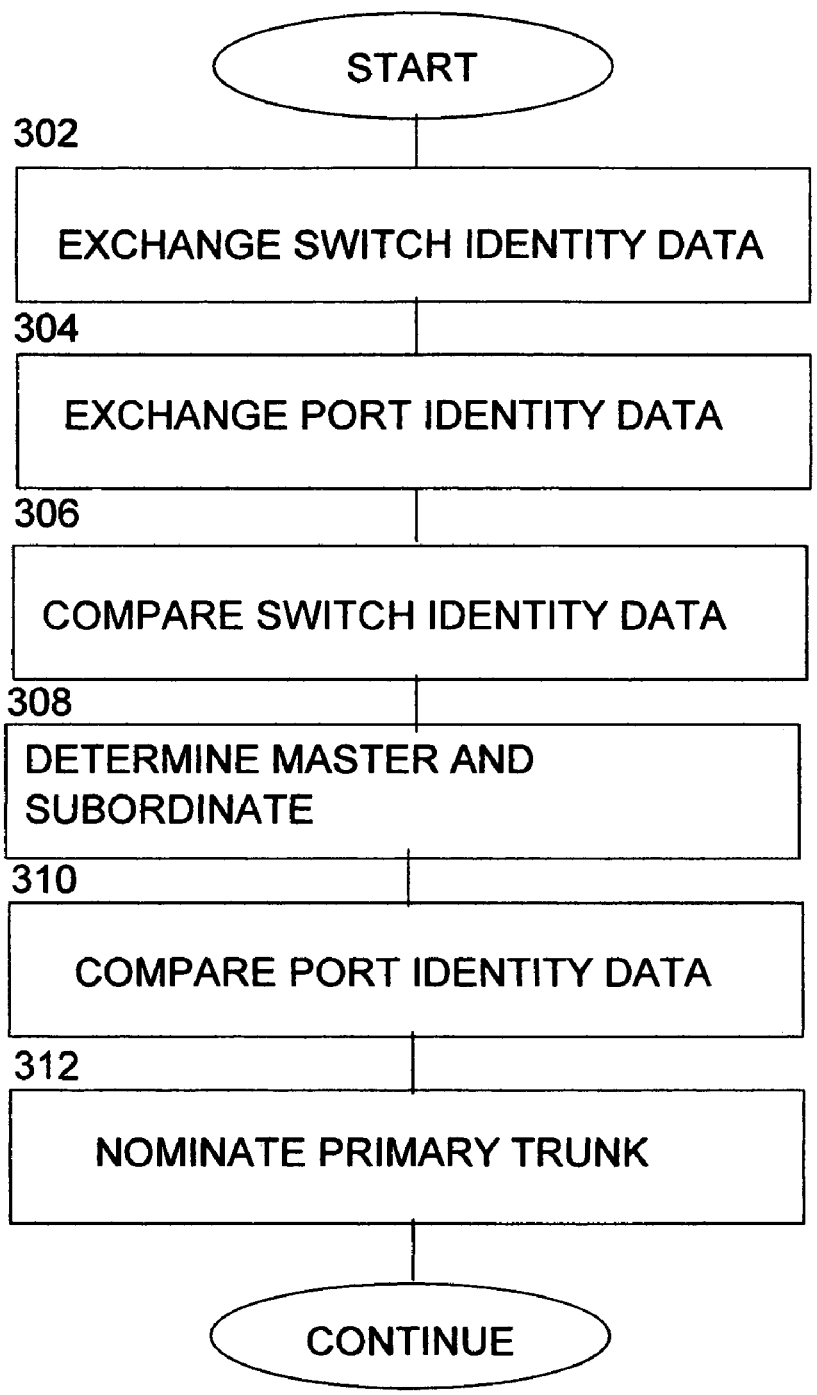
FIG. 3 illustrates the steps of one preferred method of operating a switch pair according to a preferred embodiment of the present invention.

Turning now to FIG. 3, there is illustrated a method for assigning a primary trunking connection between a switch pair (S1, S2), comprising the step of exchanging (302), between the switch pair (S1, S2), the identity data for each member of the switch pair. This may comprise a unique serial number, for example, a World Wide Number (WWN). At step 304, identity data for ports P1, P2, P3 . . . ) owned by each of said switch pair is exchanged. The exchange may be part of the initialization procedure, in which all components identify themselves to all other components in the network, or it may be performed as part of a recovery process, after an interruption of network or component service.

At step 306 the identity data for each member of the switch pair is examined by each member of the switch pair independently, to determine at step 308 which of the switch pair is master and which of the switch pair is subordinate. This maybe done by comparing the exemplary serial numbers and selecting, for example, the lowest as master. Each member of the switch pair performs the comparison independently of the other, and thus a deterministic outcome is achieved without the switch pair needing to communicate. This advantageously reduces the number of flows required, and thus improves the performance of the system.

In a most preferred embodiment the first requirement of the method is that two types of identifiers are required. The first is a serial number that is unique for each switch device. The second is an identifier that is unique to each trunking port within any switch device. The method requires that on connection, this information is passed between trunking ports in the switch devices.

In a firmware embodiment of the method of the present invention, the firmware associated with each switch now has the following information: its own switch serial number and its own trunking port assignment; the serial number of the connected switch and that switch's trunking port assigment.

In one embodiment, for practical purposes, each port will be initially designated by default as a primary trunk, even if it is not connected. When a connection is made, the firmware logs the other switch serial number and port assigment against that port. The process then continues as described below.

At step 310, the identity data for each port owned by each member of the switch pair is examined by each member of the switch pair independently, to determine which of the ports owned by the identified master switch has primacy over all the other ports owned by that master switch.

At step 312, responsive to the determination described above, each of the switch pair independently nominates the connection between the port having primacy at the master and the port owned by the subordinate to which it is connected, as the primary trunking connection.

Thus, as all the identity data for each switch and each owned port is shared and thus "known" to both members of the switch pair, each can independently nominate the correct connection as primary to preserve the determinism of the system in spite of any variations in the sequence of initialization or recovery.

In a preferred firmware embodiment, the firmware in each switch can now build a table of assigments by port, that include the other switch's serial number and port assignment.

If there is another port connected to that switch, as detected by finding a connection with a matching serial number, the firmware in each switch tests the serial number and uses a simple comparison to choose a switch to be master; for example, the switch with the lowest, or the highest, ranking serial number. Many alternative embodiments of this feature will be clear to one of ordinary skill in the art, and need not be enumerated here. If the firmware determines that it is directly associated with the master switch, it chooses the primary trunk as the one with, for example, the lowest port number, and the secondary with the second lowest, etc. The subordinate switch will know that it should not use its own port assigment and can therefore make the same analysis, but based on the master switch's ports.

Removal of a connection causes each switch to reassign master and secondary roles accordingly. Each switch reexamines its switch and port identity data and determines which of the remaining trunking connections meets the shared criteria to become the new primary.

The outcome is thus advantageously always a matched set of connections, primary to primary, secondary to secondary and so on regardless of the order in which the switch hardware informs the firmware of any particular connection.

In the embodiment of the present invention hereinbefore described with reference to FIG. 3, all data associated with a complete set of connections between a switch pair is exchanged in one shot between the switches of the pair. However, it will be appreciated that, in other embodiments of the present invention, data associated with one or more ports in a switch pair may be exchanged independently of the other ports in the switch pair. It will also be appreciated that, in the event of one or more ports in a switch pair failing, data associated with such ports may be discarded from subsequent exchanges and the comparison reapplied from step 306 only for those ports remaining operational.

What is claimed is:

1. A method for assigning a primary trunking connection between a switch pair, comprising the steps of:
    supplying a first switch and a second switch, wherein said first switch is directly interconnected to said second switch, and wherein said first switch and said second switch comprise said switch pair;
    exchanging, between said switch pair, first identity data for each switch of said switch pair and second identity data for ports owned by each switch of said switch pair;
    using said first identity data, by each switch of said switch pair independently, to determine which switch of said switch pair is master and which switch of said switch pair is subordinate;
    using said second identity data, by each switch of said switch pair independently, to determine which of said ports owned by said master has primacy over all other of said ports owned by said master;
    responsive to said determining, nominating, by each switch of said switch pair independently, a connection between said port having primacy at said master and any port owned by said subordinate, as primary trunking connection;
    wherein said first identity data and said second identity data is exchanged using a single exchange between said switch pair.

2. The method of claim 1, further comprising the step of nominating, by each switch of said switch pair independently, a connection between a port other than said port having primacy at said master and any port owned by said subordinate, as secondary trunking connection.

3. The method of claim 1, wherein said first identity data is numeric.

4. The method of claim 3, wherein said step of using said first identity data comprises comparing said first identity data from said master with said first identity data from said subordinate.

5. The method of claim 1, wherein said second identity data is numeric.

6. The method of claim 5, wherein said step of using said first identity data comprises comparing said first identity data from said master with said first identity data from said subordinate.

7. The method of claim 1, wherein said switch pair ties in a topology comprising a host processor and a storage device.

8. The method of claim 7, wherein said storage device comprises a storage area network.

9. The method of claim 1, performed during switch initialization.

10. The method of claim 1, performed during switch recovery.

11. A logic arrangement comprising computer program code tangibly stored in a computer-readable medium for assigning a primary trunking connection between a switch pair, comprising:
    a first switch and a second switch, wherein said first switch is directly interconnected to said second switch, and wherein said first switch and said second switch comprise said switch pair;
    a data exchange component for exchanging, between said switch pair, first identity data for each switch of said switch pair and second identity data for ports owned by each switch of said switch pair, wherein said first identity data and said second identity data is exchanged using a single exchange between said switch pair;
    a first determining component for using said first identity data, by each switch of said switch pair independently, to determine which switch of said switch pair is master and which switch of said switch pair is subordinate;

a second determining component for using said second identity data, by each switch of said switch pair independently, to determine which of said ports owned by said master has primacy over all other of said ports owned by said master;

a nominating component, responsive to said first and said second determining components, for nominating, by each switch of said switch pair independently, a connection between said port having primacy at said master and any port owned by said subordinate, as primary trunking connection.

12. The logic arrangement of claim 11, further comprising a further nominating component for nominating, by each switch of said switch pair independently, a connection between a port other than said port having primacy at said master and any port owned by said subordinate, as secondary trunking connection.

13. The logic arrangement of claim 11, wherein said first identity data is numeric.

14. The logic arrangement of claim 13, wherein said first determining component comprises a comparator for comparing said first identity data from said master with said first identity data from said subordinate.

15. The logic arrangement of claim 11, wherein said second identity data is numeric.

16. The logic arrangement of claim 15, wherein said second determining component comprises a comparator for comparing said first identity data from said master with said first identity data from said subordinate.

17. The logic arrangement of claim 11, wherein said switch pair lies in a topology comprising a host processor and a storage device.

18. The logic arrangement of claim 17, wherein said storage device comprises a storage area network.

19. The logic arrangement of claim 18, wherein said storage area network comprises a storage virtualization controller.

20. A computer program product comprising computer program code tangibly stored in a computer-readable medium, to, when loaded into a computer system and executed thereon, cause said computer system to assign a primary trunking connection between a first switch and a second switch, wherein said first switch is directly interconnected to said second switch, and wherein said first switch and. said second switch comprise a switch pair by performing the steps of:

exchanging, between said switch pair, first identity data for each switch of said switch pair and second identity data for ports owned by each switch of said switch pair, wherein said first identity data and said second identity data is exchanged using a single exchange between said switch pair;

using said first identity data, by each switch of said switch pair independently, to determine which switch of said switch pair is master and which switch of said switch pair is subordinate;

using said second identity data, by each switch of said switch pair independently, to determine which of said ports owned by said master has primacy over all other of said ports owned by said master;

responsive to said determining, nominating, by each switch of said switch pair independently, a connection between said port having primacy at said master and any port owned by said subordinate, as primary trunking connection.

21. The computer program product of claim 20, further comprising computer program code tangibly stored in a computer-readable medium, to, when loaded into a computer system and executed thereon, cause said computer system to perform the step of nominating, by each switch of said switch pair independently, a connection between a port other than said port having primacy at said master and any port owned by said subordinate, as secondary trunking connection.

22. The computer program product of claim 20, wherein said first identity data is numeric.

23. The computer program product of claim 22, wherein said step of using said first identity data comprises comparing said first identity data from said master with said first identity data from said subordinate.

24. The computer program product of claim 20, wherein said second identity data is numeric.

25. The computer program product of claim 24, wherein said step of using said first identity data comprises comparing said first identity data from said master with said first identity data from said subordinate.

26. The computer program product of claim 20, wherein said switch pair lies in a topology comprising a host processor and a storage device.

* * * * *